(12) United States Patent
Chen

(10) Patent No.: US 8,264,845 B2
(45) Date of Patent: Sep. 11, 2012

(54) ELECTRONIC DEVICE WITH COVER EJECTION MECHANISM

(75) Inventor: Song-Ya Chen, Shenzhen (CN)

(73) Assignees: Fu Tai Hua Industry (Shenzhen) Co., Ltd., ShenZhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 240 days.

(21) Appl. No.: 12/888,422

(22) Filed: Sep. 23, 2010

(65) Prior Publication Data

US 2011/0255256 A1    Oct. 20, 2011

(51) Int. Cl.
*H05K 5/00* (2006.01)
(52) U.S. Cl. .................. 361/759; 361/755; 361/802
(58) Field of Classification Search .................. 361/600, 361/679.01, 679.02, 679.57, 724, 725, 740, 361/755, 759, 801–803; 439/152, 159, 160, 439/374, 377, 630
See application file for complete search history.

(56) References Cited

U.S. PATENT DOCUMENTS

| 5,825,616 A * | 10/1998 | Howell et al. ............ 361/679.38 |
| 6,592,385 B1 * | 7/2003 | Chen ............................. 439/159 |
| 7,651,351 B2 * | 1/2010 | Yen et al. ...................... 439/159 |
| 7,986,530 B2 * | 7/2011 | Chang et al. .................. 361/747 |
| 8,000,104 B2 * | 8/2011 | Kim et al. ...................... 361/730 |
| 8,203,844 B2 * | 6/2012 | Sip et al. ....................... 361/755 |

* cited by examiner

*Primary Examiner* — Hung S Bui
(74) *Attorney, Agent, or Firm* — Altis Law Group, Inc.

(57) ABSTRACT

An electronic device includes a main body including a guiding portion, and a back cover and a cover ejection mechanism. The cover ejection mechanism includes an ejection member and a locking member. The ejection member includes a sliding block defining an inclined surface. The locking member includes a locking element defining a first inclined surface and a second inclined surface, and en elastic element. To close the back cover, the back cover is rotated and the sliding block is pushed to slide. When the inclined surface touches the first inclined surface, the locking element is pushed to move, causing the elastic element to be compressed. After the sliding block slides over the locking element, the elastic element rebounds to push the locking element to return to an initial position where the sliding block is blocked by the second inclined surface of the locking element.

9 Claims, 9 Drawing Sheets

ELECTRONIC DEVICE WITH COVER EJECTION MECHANISM

BACKGROUND

1. Technical Field

The present disclosure relates to electronic devices and, particularly, to an electronic device with a cover ejection mechanism that can automatically eject the cover.

2. Description of Related Art

Electronic devices such as mobile phones usually include a main body and a back cover cooperating with the main body to form a receiving space for receiving an electronic card. When removing or inserting the electronic card, a back cover of the electronic device usually needs to be removed. After frequently detaching the back cover, it may become loose or wear out and may tend to be detached unintentionally from the electronic device.

Therefore, what is needed is an electronic device which utilizes a cover ejection mechanism to overcome the described shortcoming.

DETAILED DESCRIPTION

Figure 1:
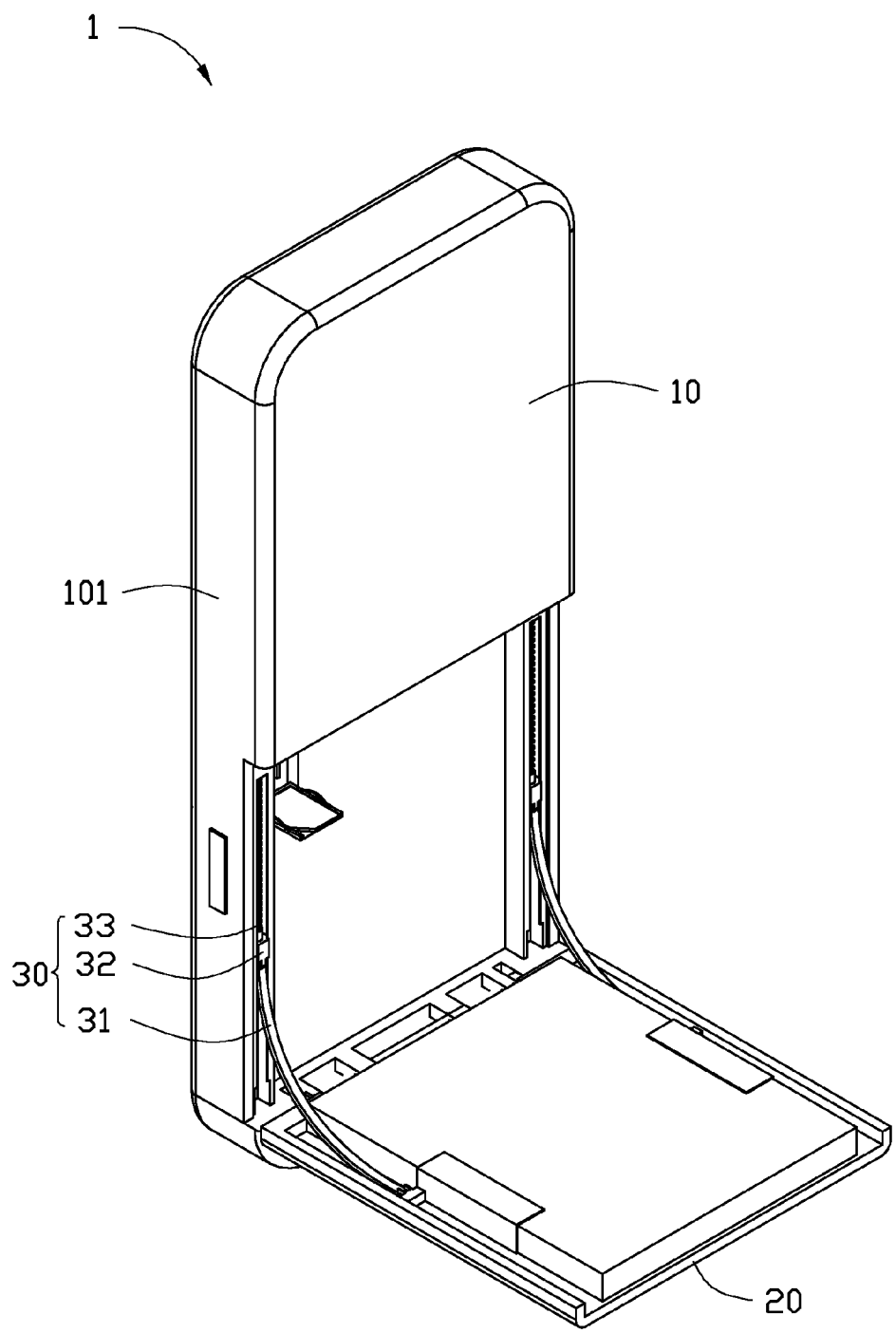
FIG. 1 is an isometric view of an electronic device in accordance with an exemplary embodiment.
Figure 2:
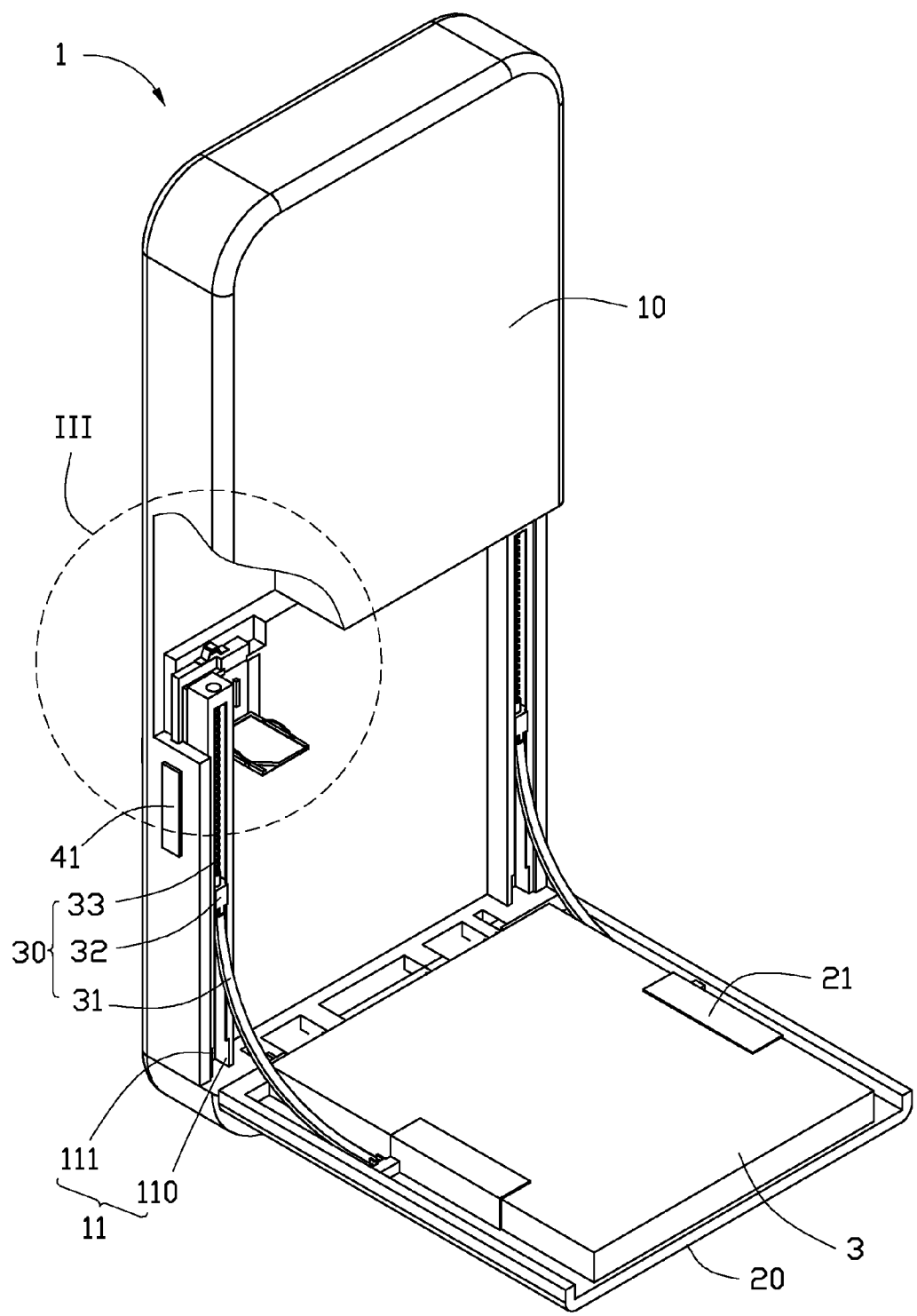
FIG. 2 is a perspective view of a portion of the electronic device of FIG. 1.

Referring to FIGS. 1-2, an embodiment of an electronic device 1 is illustrated. The electronic device 1 includes a main body 10, a back cover 20 rotatably connected to the main body 10, and a cover ejection mechanism 70 connected to the back cover 20 and the main body 10. In one embodiment, the electronic device 1 is a mobile device.

The main body 10 includes at least one guiding portion 11. The guiding portion 11 defines a sliding groove 110 along a lengthwise direction thereof and a slot 111 along a lengthwise direction of the sliding groove 110. In one embodiment, there are two guiding portions 11.

The back cover 20 includes two opposing slideways 21 (see FIG. 2). The two slideways 20 are configured for receiving a battery 3.

Referring to FIGS. 3-6, the cover ejection mechanism 70 includes an ejection member 30, an unlocking member 40, and a locking member 50.

The ejection member 30 includes a first elastic element 31, a sliding block 32, and a second elastic element 33. One end of the first elastic element 31 is fixed to the sliding block 32, and an opposite end is fixed to the back cover 20. The bottom of the sliding block 32 passes through the slot 111, causing the sliding block 32 to be slidably received in the sliding groove 110. The sliding block 32 includes an inclined surface 320 (see FIG. 5). The second elastic element 33 is received in the sliding groove 110. One end of the second elastic element 33 is fixed to the sliding block 32, and an opposite end is fixed to an inner plate (not labeled) of the sliding groove 110.

The unlocking member 40 is slidably connected to a side plate 101 of the main body 10, and includes a sliding plate 41 and a pushing portion 42. The side plate 101 of the main body 10 defines a through hole (not labeled). The sliding plate 41 passes through the through hole, thereby slidably connecting the unlocking member 40 to the main body 10. The pushing portion 42 is fixedly connected to the sliding plate 41, and includes an inclined surface 420. When the sliding plate 41 is moved by an external force, the pushing portion 42 moves together with the sliding plate 41.

The locking member 50 includes a locking element 501 and an elastic element 502. The locking element 501 includes a first inclined surface 5010, a second inclined surface 5011 connected to the first inclined surface 5010, and a third inclined surface 5012. The third inclined surface 5012 is configured to engage with the second inclined surface 420 of the pushing portion 42. One end of the elastic element 502 is fixed to the locking element 501, and an opposite end is fixed to the side plate 101.

Figure 3:
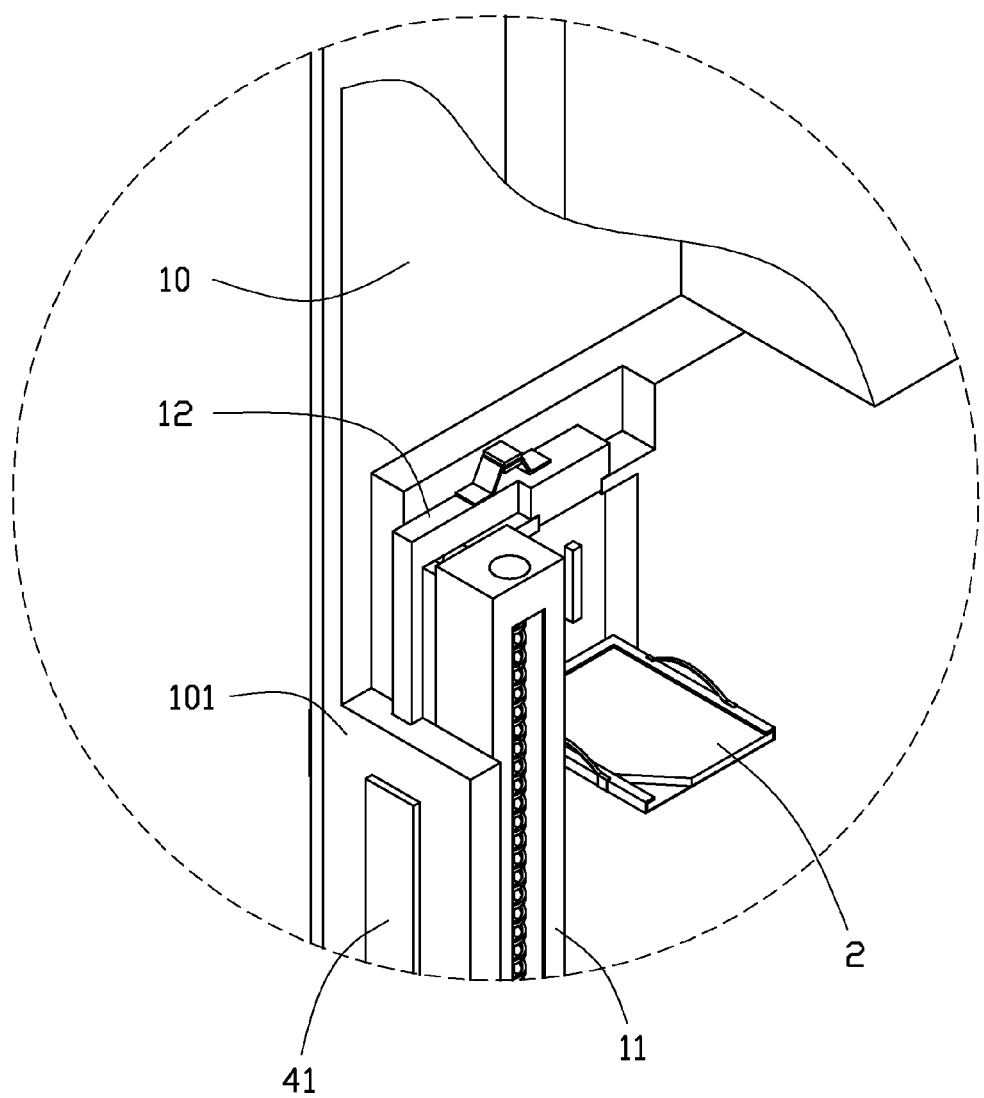
FIG. 3 is an enlarged view of circled portion III of FIG. 2.

The cover ejection mechanism 70 further includes a resetting member 12 (see FIG. 3). The resetting member 12 is located below the guiding portion 11. The resetting member 12 is substantially L-shaped and includes a first portion 121 and a second portion 122 (see FIG. 5). The first portion 121 is parallel to the guiding portion 11 and abuts against one end of the pushing portion 42. The second portion 122 is substantially perpendicular to the guiding portion 11, and is located adjacent to an inner plate (not labeled) of the main body 10. The second portion 122 includes a resetting spring 1220 on a side adjacent to the inner plate of the main body 10 and a hook portion 1221 on an opposite side. When the pushing portion 42 is pushed by an external force, the first portion 121 is moved together with the pushing portion 42 to push the second portion 122 to move toward the inner plate of the main body 10, causing the resetting spring 1220 to be compressed.

Figure 4:
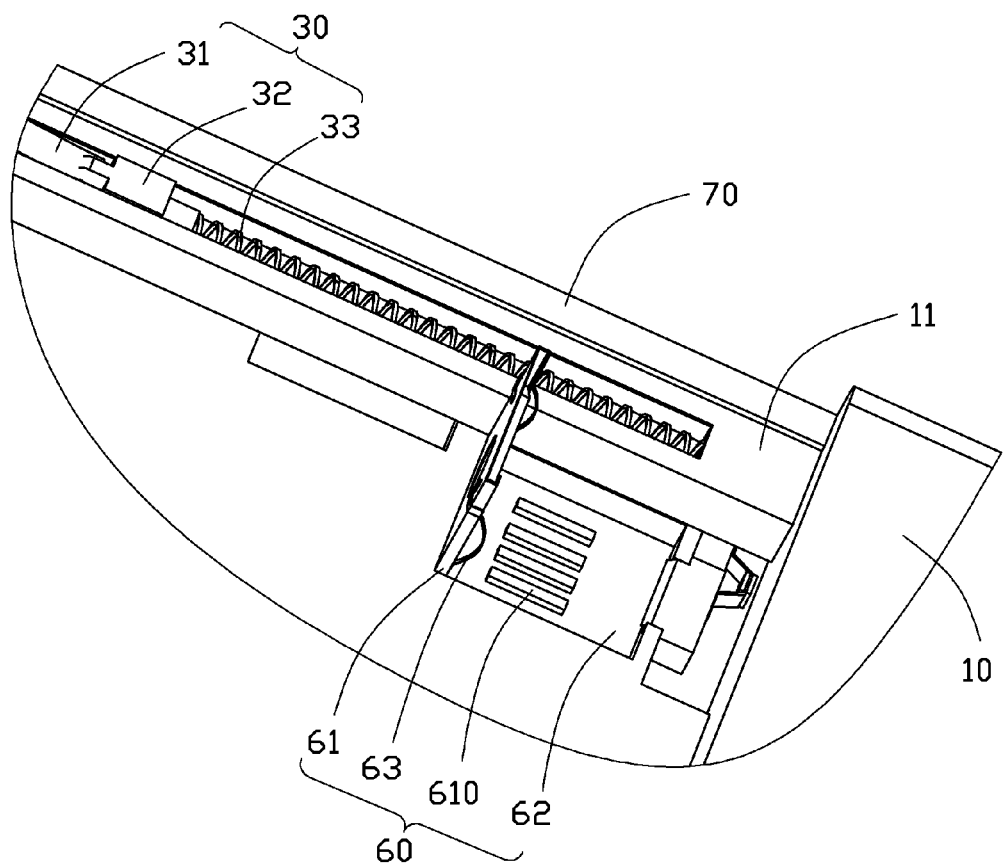
FIG. 4 is similar to FIG. 3, but viewed from another aspect.
Figure 5:
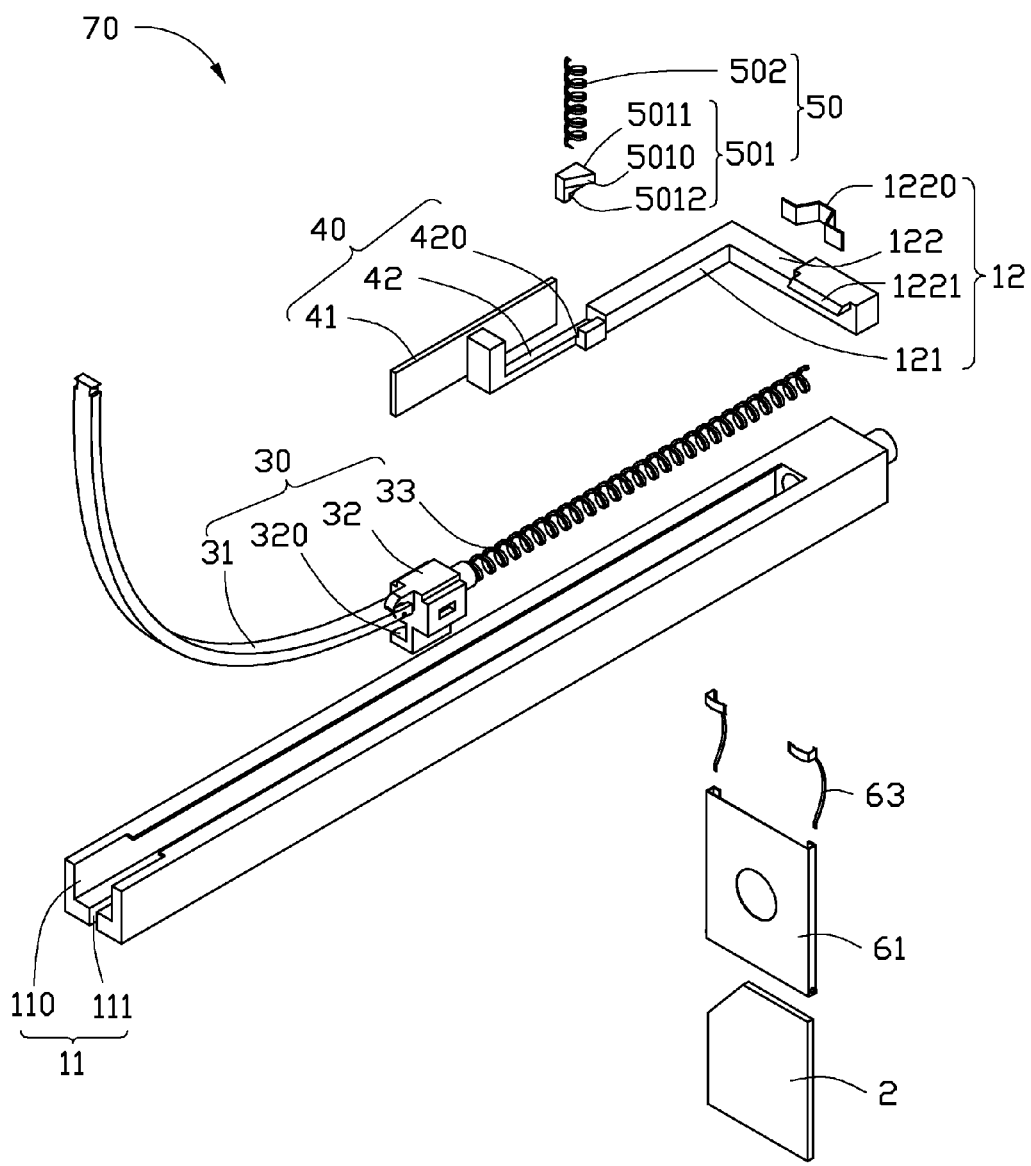
FIG. 5 is an exploded view of an ejection mechanism of the electronic device of FIG. 1.
Figure 6:
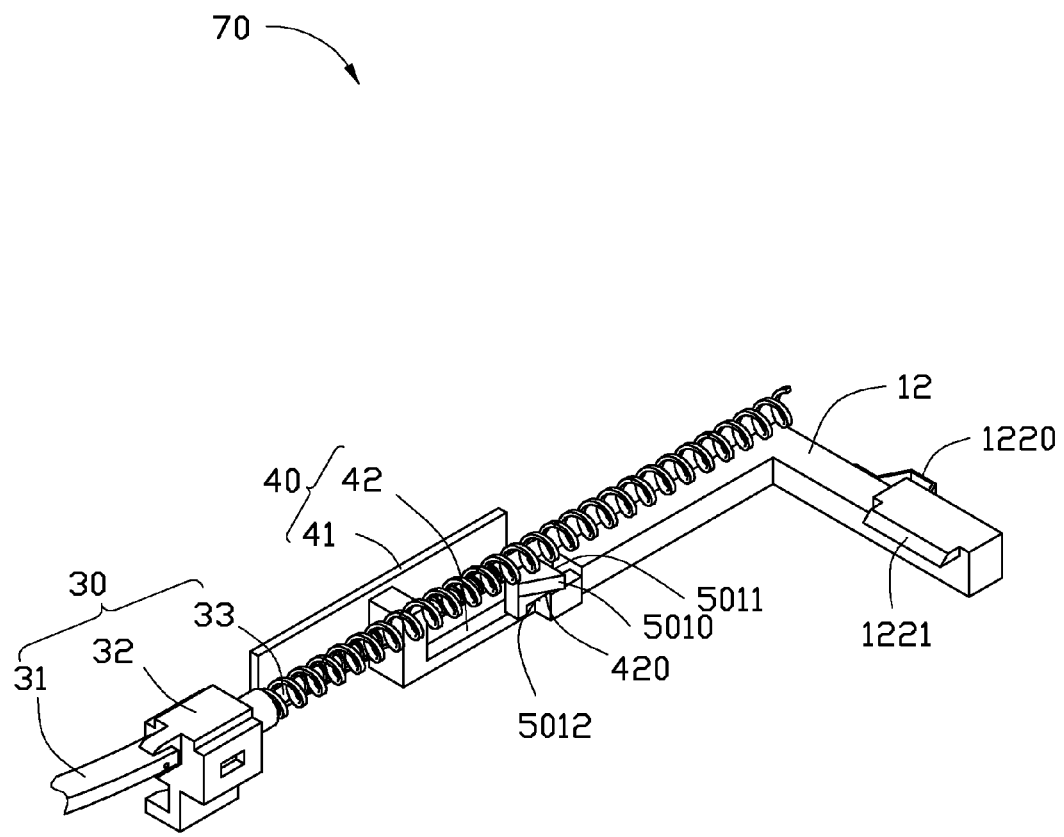
FIG. 6 is an isometric view of the ejection mechanism of FIG. 5.

The cover ejection mechanism 70 further includes a card holding member 60 (see FIG. 4). The card holding member 60 is mounted on the main body 10, and includes a receiving portion 62 and a rotation portion 61 rotatably connected to the receiving portion 62. The rotation portion 61 is configured for receiving an electronic card 2, and includes at least one elastic tab 63 fixed on its surface. At least one contact terminal 610 is mounted on a top surface of the receiving portion 62, and is configured for establishing an electrical connection with the electronic card 2 when the rotation portion 61 is rotated to be received in the receiving portion 62. In one embodiment, the number of the at least one elastic tab 62 is two.

When assembling, the back cover 20 is rotatably connected to the main body 11, the battery 3 is placed inside of the back cover 20. One end of the first elastic element 31 is fixed to the sliding block 32, and an opposite end is fixed to the back cover 20. One end of the second elastic element 33 is connected to the sliding block 32, and an opposite end is fixed to the inner plate of the sliding groove 110. The bottom of the sliding block 32 passes through the slot 111 to slidably connect the sliding block 32 to the sliding groove 110. The sliding plate 41 passes through the through hole of the side plate 101 of the main body 10 to slidably connect the unlocking member 40 to the main body 10. The third inclined surface 5012 of the locking element 501 is placed on the inclined surface 420 of the pushing portion 42, one end of the elastic element 502 is fixed to the side plate 101, and an opposite end is fixed to the locking element 501, thereby fixing the locking element 501 on the inclined surface 420 of the pushing portion 42. The resetting member 12 is placed adjacent to one end of the guiding portion 11 as seen in FIG. 3, with the first portion 121 abutting against the end of the pushing portion 42, and the second portion 122 adjacent to the inner plate of the main body 10. Then, the electronic card 2 is placed in the rotation portion 61.

Figure 7:
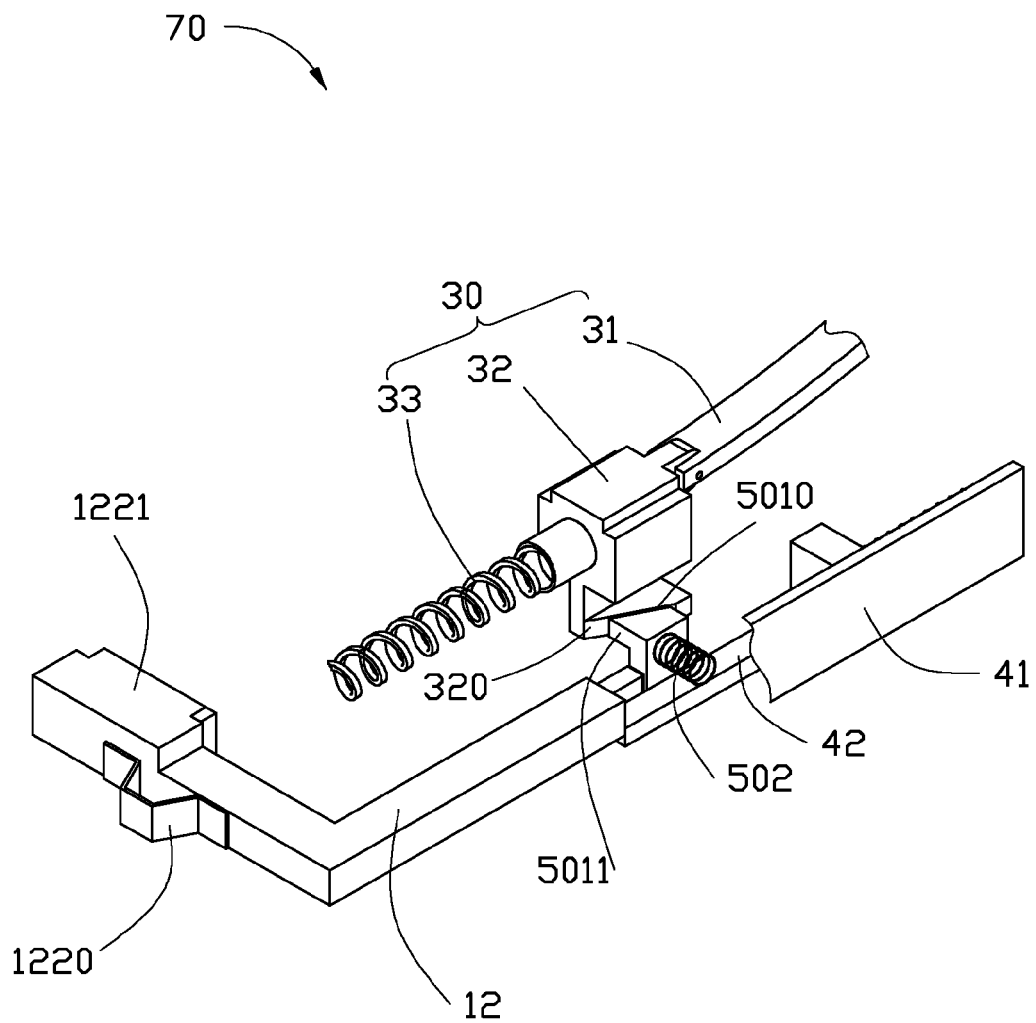
FIG. 7 shows a locking element cooperating with a sliding block of the cover ejection mechanism in a first state.
Figure 8:
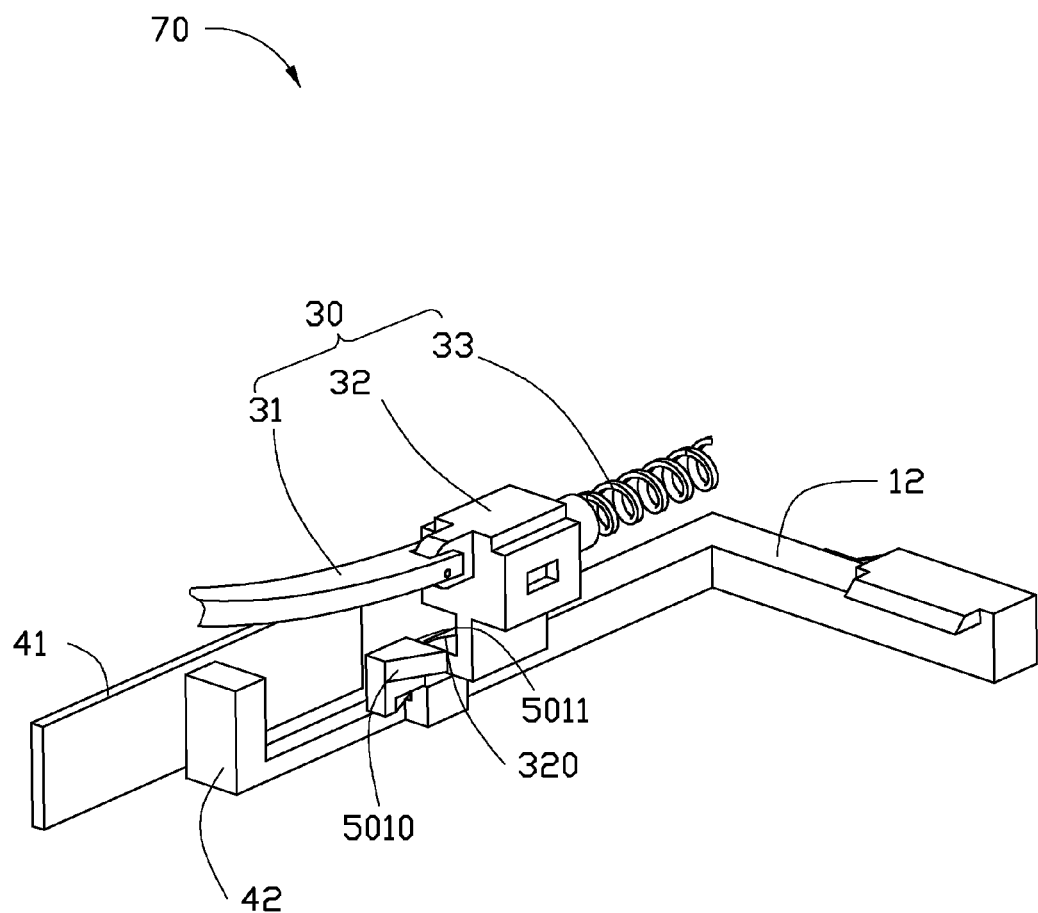
FIG. 8 is similar to FIG. 7 but from a reverse angle to show the locking element and the sliding block in a second state.
Figure 9:
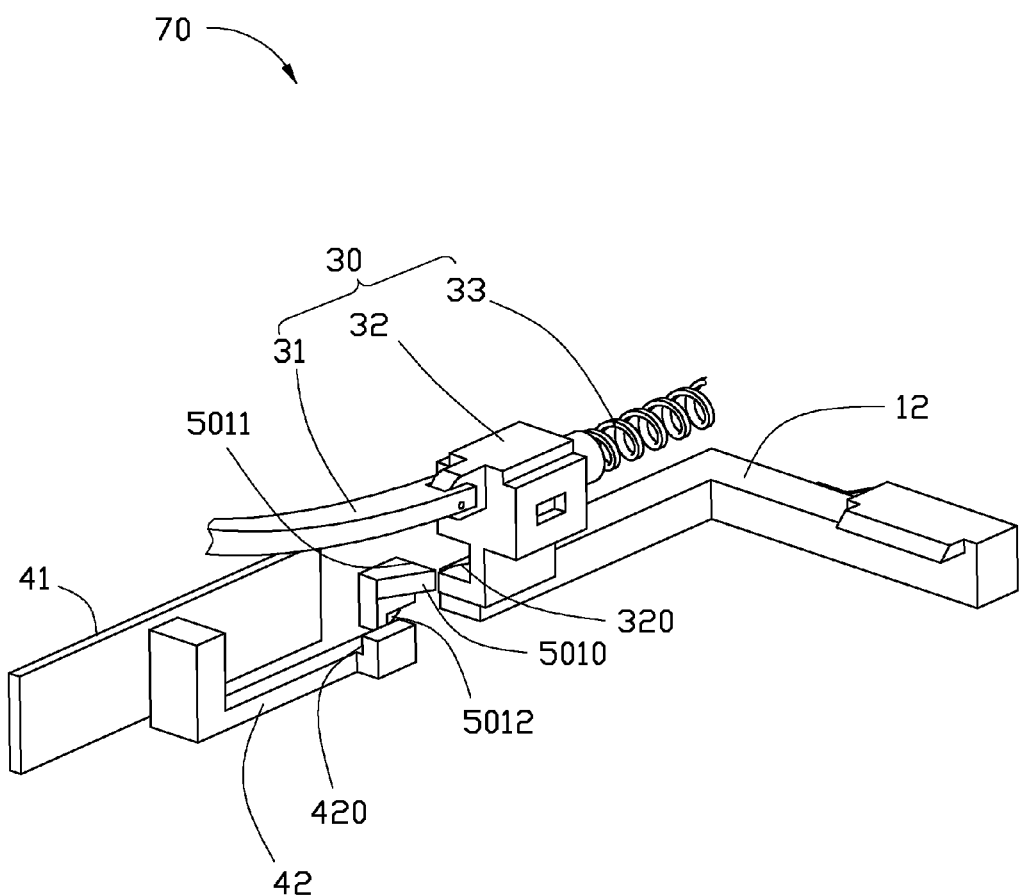
FIG. 9 is similar to FIG. 8 but showing the siding block disengaged from the locking element.

Referring also to FIGS. 7-9, to close the back cover 20, the back cover 20 is rotated relative to the main body 10. The first elastic element 31 is driven to push the sliding block 32 to slide in the sliding groove 110 by the back cover 20. When the inclined surface 320 of the sliding block 32 contacts the first inclined surface 5010, the locking element 501 is pushed by the sliding block 32 and moved along a direction substantially perpendicular to a sliding direction of the sliding block 32. The elastic element 502 is compressed by the locking element 501. When the sliding block 32 slides over the locking element 501, the back cover 20 covers the main body 10, the elastic element 502 rebounds to push the locking element 501 to return to an initial position. During the sliding movement of the sliding block 32, the second elastic element 33 is compressed by the sliding block 32. The sliding block 32 is kept in a predetermined position by the second inclined surface 5011 of the locking element 501, thereby preventing the back cover 20 from disengaging from the main body 10.

During rotation of the back cover 20 relative to the main body 10, the rotation portion 61 is driven to rotate relative to the receiving portion 62 by the back cover 20. When the back cover 20 fully covers the main body 10, the sliding plate 41 is pushed by a user to drive the pushing portion 42 to push the resetting member 12 to move toward the inner plate of the main body 10, causing the resetting spring 1220 to be compressed. After the back cover 20 fully covers the main body 10, the rotation portion 61 is fully received in the receiving portion 62, causing the tab 63 to be compressed. When the external force applied on the sliding plate 41 is ceased, the resetting spring 1220 rebounds to push the hook portion 1221 to move away from the inner plate of the main body 10 until the hook portion 1221 engages on the top surface of the rotation portion 61, thereby fixing the rotation portion 62 in the receiving portion 61.

To open the back cover 20, the sliding plate 40 is pushed by the user to drive the pushing portion 42 to move until the inclined surface 420 of the pushing portion 42 contacts the third inclined surface 5012. The locking element 501 is moved by the pushing portion 42 until the locking element 501 disengages from the sliding block 32. Then, the sliding block 32 is freed from the locking element 501. The second elastic element 33 rebounds to push the sliding block 32 to slide along the sliding groove 110, causing the back cover 20 to be opened by the first elastic element 32.

After the back cover 20 is opened, to replace the electronic card 2, the rotation portion 61 needs to be opened from the receiving portion 62. The sliding plate 41 is pushed by the user to drive the pushing portion 42 to push the resetting member 12 to move toward the inner plate of the main body 10, causing the resetting spring 1220 to be compressed. During compressing the resetting spring 1220, the hook portion 1221 moves away from the rotation portion 61 until the hook portion 1221 disengages from the top surface of the rotation portion 61. The tab 63 rebounds to push the rotation portion 61 to rotate out of the receiving portion 62. Then, the user can replace the electronic card 2 from the rotation portion 61.

Although the present disclosure has been specifically described on the basis of the exemplary embodiment thereof, the disclosure is not to be construed as being limited thereto. Various changes or modifications may be made to the embodiment without departing from the scope and spirit of the disclosure.

What is claimed is:

1. An electronic device comprising:
a main body comprising a guiding portion;
a back cover rotatably connected to the main body, and configured for receiving a battery; and
a cover ejection mechanism comprising:
an ejection member slidably connected to the guiding portion, and comprising a sliding block defining an inclined surface; and
a locking member slidably connected to the main body, and comprising:
a locking element defining a first inclined surface and a second inclined surface connected to the first inclined surface; and
an elastic element, wherein one end of the elastic element is fixed to the locking element, and an opposite end is fixed to a side plate of the main body;
wherein when the back cover is rotated relative to the main body, the sliding block is pushed by the back cover to slide along the guiding portion, when the inclined surface of the sliding block touches the first inclined surface, the locking element is pushed by the sliding block to move along a direction substantially perpendicular to the guiding portion, causing the elastic element to be compressed, after the sliding block slides over the locking element, the back cover covers the main body, the elastic element rebounds to push the locking element to return to an initial position where the sliding block is blocked by the second inclined surface of the locking element, thereby preventing the back cover from disengaging from the main body.

2. The electronic device as described in claim 1, wherein the ejection member further comprises a first elastic element and a second elastic element; one end of the first elastic element is fixed to the sliding block, and an opposite end of the first elastic element is fixed to the back cover; one end of the second elastic element is fixed to the sliding block, and an opposite end of the second elastic element is fixed to the guiding portion; during covering the back cover on the main body, the first elastic element is driven by the back cover to push the sliding block to slide, causing the second elastic element to be compressed.

3. The electronic device as described in claim 2, wherein the cover ejection mechanism further comprises an unlocking member slidably connected to the side plate of the main body, the unlocking member comprises a sliding plate and a pushing portion, the sliding plate is near the side plate of the main body, the pushing portion comprises an inclined surface, the locking element further defines a third inclined surface, when to open the back cover from the main body, the sliding plate is forced to push the pushing portion to move, when the inclined surface of the pushing portion touches the third inclined surface of the locking element, the locking element is pushed to move by the pushing portion until the locking element disengages from the sliding block, the second elastic element rebounds to push the sliding block to slide to push the first elastic element, causing the back cover to be opened by the first elastic element.

4. The electronic device as described in claim 3, wherein the cover ejection mechanism further comprises a card holding member mounted on the main body and a resetting member located adjacent to the guiding portion, the card holding member comprises a receiving portion and a rotation portion rotatably connected to the receiving portion, the rotation portion is configured for receiving an electronic card, and comprises at least one elastic tab mounted on its surface, the resetting member comprises a resetting spring on a side adjacent to an inner plate of the main body and a hook portion on an opposite side, during covering the back cover on the main body, the rotation portion is driven by the back cover to rotate relative to the receiving portion, the sliding plate is forced by an external force to drive the pushing portion to push the resetting member to move toward the inner plate of the main body until the resetting spring is compressed, when the back cover covers the main body, the rotation portion is fully received in the receiving portion, causing the elastic tab to be compressed, when the external force applied on the sliding plate is ceased, the resetting spring rebounds to push the hook portion to move away from the inner plate until the hook portion engages on a top surface of the rotation portion, thereby fixing the rotation portion in the receiving portion.

5. The electronic device as described in claim 4, wherein after the back cover is opened, the sliding plate is forced by the external force to drive the pushing portion to push the resetting member to move toward the inner plate of the main body until the resetting spring is compressed, during movement of the resetting member, the hook portion is moved toward the inner plate of the main body until the hook portion disengages from the rotation portion, the tab rebounds to push the rotation portion to rotate out of the receiving portion.

6. The electronic device as described in claim 4, wherein the resetting member is substantially L-shaped.

7. The electronic device as described in claim 4, wherein at least one contact terminal is mounted on the receiving portion, when the rotation portion is fully received in the receiving portion, the contact terminal is configured for establishing an electrical connection with the electronic card.

8. The electronic device as described in claim 4, wherein the resetting member further comprises a first portion and a second portion, the first portion is parallel to the guiding portion and abuts again one end of the pushing portion, the second portion is substantially perpendicular to the guiding portion, and is located adjacent to the inner plate of the main body, the resetting spring and the hook portion are oppositely mounted on the second portion.

9. The electronic device as described in claim 1, wherein the guiding portion defines a sliding groove along a lengthwise direction thereof and a slot along a lengthwise direction of the sliding groove, the slot penetrates a bottom of the sliding groove, a bottom of the sliding block passes through the slot, thereby slidably connecting the ejection member to the sliding groove.

* * * * *

UNITED STATES PATENT AND TRADEMARK OFFICE
CERTIFICATE OF CORRECTION

PATENT NO. : 8,264,845 B2
APPLICATION NO. : 12/888422
DATED : September 11, 2012
INVENTOR(S) : Song-Ya Chen Page 1 of 1

It is certified that error appears in the above-identified patent and that said Letters Patent is hereby corrected as shown below:

On the title page, please insert Item (30) regarding "Foreign Application Priority Data" with the following:

-- (30)    Foreign Application Priority Data

Apr. 19, 2010    (CN) .......................201010150047.8 --

Signed and Sealed this
Twenty-ninth Day of October, 2013

Teresa Stanek Rea
*Deputy Director of the United States Patent and Trademark Office*